United States Patent [19]

Takabayashi

[11] Patent Number: 5,023,150
[45] Date of Patent: Jun. 11, 1991

[54] METHOD AND APPARATUS FOR CONTROLLING A FUEL CELL

[75] Inventor: Yasuhiro Takabayashi, Kawasaki, Japan

[73] Assignee: Fuji Electric Co., Ltd., Kawasaki, Japan

[21] Appl. No.: 392,290

[22] Filed: Aug. 11, 1989

[30] Foreign Application Priority Data

Aug. 19, 1988 [JP] Japan .................. 63-204765
Jun. 22, 1989 [JP] Japan .................. 63-158300

[51] Int. Cl.$^5$ ............................. H01M 8/04
[52] U.S. Cl. ......................... 429/22; 429/23
[58] Field of Search ..................... 429/22, 23

[56] References Cited

U.S. PATENT DOCUMENTS 3,915,747 10/1975 Summers et al. ............ 429/23
4,839,574 6/1989 Takabayashi ............. 429/23 X
4,883,724 11/1989 Yamamoto ................ 429/23

OTHER PUBLICATIONS

Fuji Jihou, vol. 61, No. 2, 1988, 156 (40) page, Japan.

Primary Examiner—Stephen J. Kalafut
Attorney, Agent, or Firm—Spencer & Frank

[57] ABSTRACT

A fuel cell power supply system includes a fuel cell and a converter which converts the DC output power of the fuel cell into the corresponding AC output power. A reduced-size converter or invertor may be employed by following the sequence consisting of checking to see whether there is an open-circuit voltage at the start-up of the fuel cell, followed by reducing the voltage across the fuel cell by using a discharging resistor and then rendering the converter or inverter operational. A switch is included, which is normally closed and selectively connects the discharging resistor and the fuel cell in parallel. This allows the fuel cell to continue to discharge when the fuel cell or system has been terminated normally or in case the appropriate control power supply should fail. The fuel cell is thus protected against any degradation that may occur due to any residual FC gas that may remain in the fuel cell and conduit passages, by allowing any voltage caused by the residual FC gas to discharge rapidly.

9 Claims, 15 Drawing Sheets

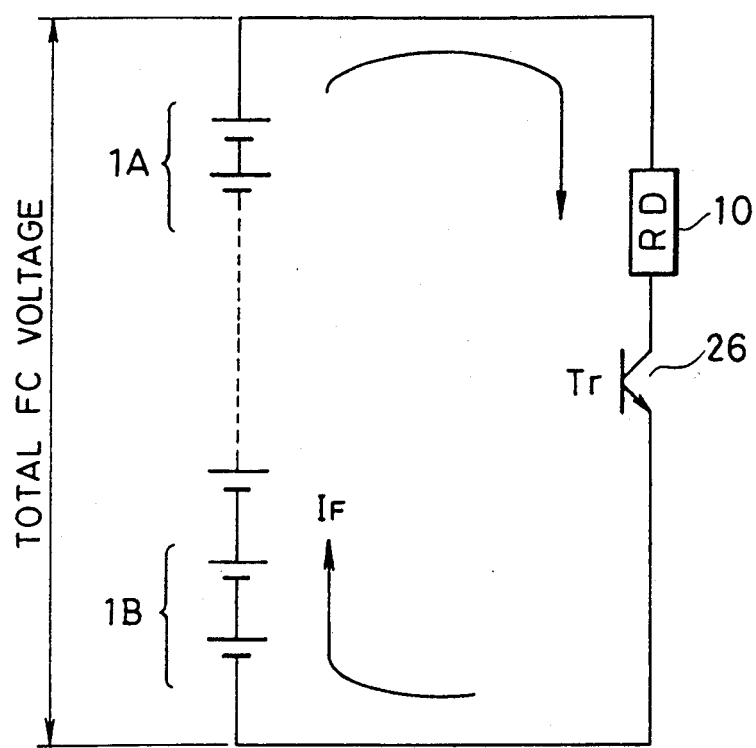
FIG.14A
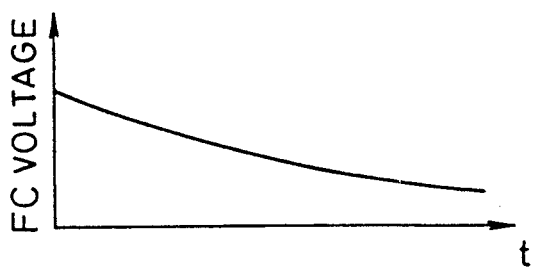 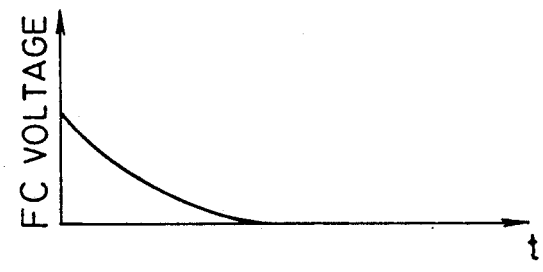
FIG.14B  FIG.14C

METHOD AND APPARATUS FOR CONTROLLING A FUEL CELL

BACKGROUND OF THE INVENTION

1. Field of the Invention

The present invention relates to a fuel cell power generator system, more particularly to a method of and an apparatus for controlling the output voltage of the fuel cell in that type of power generator system.

2. Description of the Prior Art

The output voltage of a fuel cell may typically have its value varying greatly, depending upon whether the fuel cell is actually supplying its power to any particular load or not.

It is also known that the fuel cell will degrade if it is left in its high voltage level (such as above 0.8 Volts per cell), and it will also degrade due to the reversed polarity effect that may occur if the fuel cell is at its low voltage level.

The power generator system that employs the fuel cell converts a DC electrical power supplied by the fuel cell into a DC power or AC power by using any appropriate DC-to-DC converter or DC-to-AC converter, so that either of the converted currents can be supplied to its attached load. As the output voltage of the fuel cell may vary greatly as described above, the DC-to-DC converted or DC-to-AC converter includes a power element which usually have a high withstand voltage property.

When the fuel cell is left in its high voltage state, an electrochemical reaction may be caused by any residual gases that remain in the fuel cell if the power generator system is stopped (therefore the converter is also stopped). This reaction produces a high voltage when the system is placed under no load condition. In the prior art, a discharging circuit is incorporated in the power generator system to remove the high voltage as soon as it is produced by the reaction.

When the discharging circuit is used to remove the high voltage, it must be controlled by its own power supply, and this control power supply is typically provided from any external power source. It should be noted, however, that for a mobile fuel-cell power generator system, it would be practically difficult to use the external power source as such control power supply.

The power generator system that employs the fuel cell (which will be referred to hereinafter as "FC") may typically be started up or stopped in the manner as shown in FIG. 1. The curves 401, 402, and 403 shown in FIG. 1 represent the respective changes over a given time in the FC voltage, the FC current, and the amount of the FC introduced gas. The FC rising temperature period ($t_1$) corresponds to the period from the moment that the FC1 is started up until the moment that any FC gas, such as fuel gas and oxygen gas is to be fed into FC1. Once any FC gas is fed into the FC1, the FC voltage is increasing rapidly. The FC open-circuit voltage checking period ($t_2$) corresponds to the period from the moment that the gas has been fed into the FC1 until the moment that the FC1 generates electricity and is beginning to supply the generated electricity.

The generated power increasing period ($t_3$) corresponds to the transitional period from the start of the power supply until the moment that the power supply can become constant. During the following period ($t_4$) when the particular power requirements may be supplied, the power will be provided from the FC1 in the constant manner. The final-stage period ($t_5$) corresponds to the time that may be required from the moment that the FC gas has ceased to be fed, causing the FC1 to stop its power supply until the moment that the FC voltage is falling to approximately zero (0).

Those segments designated by A, C, and b, respectively, in FIG. 1 will be described later by referring to FIGS. 4 and 5.

The sequence of starting up and stopping the known fuel-cell power generator system as described above and shown in FIG. 1 may be used in the plant facilities, regardless of their running capacities. Specifically, the sequence of starting up may be found in the publication "FUJI JIHOU Vol. 61, No. 2, 1988, 156 (40) page, Japan". The following describes some of the prior art sequences of producing a DC power in the fuel cell and converting the DC power into the required power to be supplied to any particular load.

The sequence that is implemented by the circuit shown in FIG. 2 consists of allowing FC1 to provide a DC power output and then allowing an invertor (INV) 2 to convert the DC power output to the corresponding AC power which is to be supplied to a particular AC load 3 or other operational systems 4.

The AC power output of the invertor 2 is delivered to a filter (FL) 5 and then to a transformer (TR) 6, from which the AC power will be supplied to the AC load 3 or other operating systems 4 when an output switch ($SW_{AC}$) 7 is placed in its "ON" position. In FIG. 2, reference numeral 8 refers to a main switch ($SW_M$), 9 refers to a discharging resistance switch ($SW_R$), and 10 refers to a discharging resistor (RD).

The circuit shown in FIGS. 3A and 3B includes a step-up chopper 11 that provides the DC-to-DC conversions in response to the DC power output from the FC1. Those parts or elements which are similar to those shown in FIG. 2 are given the same reference numerals in FIGS. 3A and 3B. Specifically, the circuit arrangement shown in FIG. 3A includes a backup battery (B) 15 which permits the fuel cell power generator system to be operational in the hybrid manner and to provide a DC power to any particular DC load 3A.

FIG. 3B illustrates a circuit arrangement that includes the step-up chopper 11 of FIG. 3A that provides the DC-to-DC conversions and an invertor 2A that provides an AC power in response to the DC power output of the step-up chopper 11 of FIG. 3A and a filter 5A that provides an AC output to the AC load 3.

FIG. 4 shows the characteristic curves for the fuel cell shown in FIG. 2. In FIG. 4, a curve 701 represents the relationships between the FC current $I_F$ and the FC voltage $V_F$. A curve 702 represents a 100% load resistance line, which may be obtained by connecting the origin and the rated point N at the time when an FC rated current value b is given along the curve 701. The value of the FC voltage that may then be developed is represented by C.

A line 703 represents changes in the discharging resistance, which may be drawn by connection the origin and the point N' at the time when the FC1, the $SW_R$9, and the RD10 forms a closed circuit. At point N', an FC current value a is provided, A line 704 represents a resistance line when the FC current value a' is given along the curve 701. At the point N', FC voltage B' may be developed.

As it may be seen from FIG. 1, the invertor 2 must be able to start at the moment when the power is to be supplied, and must have the ability to provide a current flow equal to the current value b during the period ($t_4$) from the start-up time to stop time. In other words, the invertor 2 must meet the requirements for the capacity, which may be represented by the area delimited by the original and the points A, O, and b in FIG. 4.

FIG. 5 shows the characteristic curves for the fuel cell shown in FIGS. 3A and 3B. Those lines or curves which are similar to those shown in FIG. 4 are given the same reference numbers in FIG. 5. In FIG. 5, reference numbers 801, 802, 803, and 804 correspond to the lines or curves 701, 702, 703, and 704, respectively. The curve 805 explains the relationships between the battery current $I_B$ and the battery voltage $V_B$.

As it may be seen from FIG. 1, the FC voltage is gradually increasing during the period $t_2$ until it has become higher than the battery voltage F as shown in FIG. 5 when the step-up chopper 11 has stopped. Although the step-up chopper 11 is inoperational during that period, a current can still flow through the FC1, a coil L, and a diode D into the battery 15, or the load 3A or 3. The step-up chopper 11 should start at the time when power is to be supplied as shown in FIG. 1, and must meet the requirements for the capacity, which may be represented by the area either delimited by the origin and the points A, O and b, or the origin and the points F, O" and b in FIG. 5.

At the start-up of the fuel cell, the open-circuit voltage checking period ($t_2$) in FIG. 1 corresponds to the period during which checking is made to see whether any problem has occurred within the FC gas supply system by determining that the FC generated voltage has increased above the prescribed voltage value. During this stage, any means should be provided to allow such checking to occur under no load condition in order to determine whether there is any problem with the FC gas supply system.

If a problem has occurred within the FC gas supply system, the FC generated voltage will fall. In this case, if power is supplied to the load 3 or 3A, the FC generated voltage will fall. In this situation, it would disadvantageously be impossible to check to see accurately if there is any problem with the FC1.

As it may be understood from FIG. 1, when the system is stopped, the FC gas supply will also be shut down. In this case, some of the FC gas may possibly remain within the FC1 and its associated conduit passages, causing some voltage to be developed. Therefore, means such as the open-circuit capacity converter should be provided in the FC1.

Another disadvantage of the prior art is the use of the power element that has a high withstand voltage property as one of the component parts of the converter. Using such power element increases the physical dimensions of the converter, and reduces its efficiency of conversion.

SUMMARY OF THE INVENTION

It is therefore an object of the present invention to eliminate the above described problems, and thereby to provide a method of and an apparatus for controlling a fuel cell in the manner that can allow for the use of a reduced-size converter.

In the first aspect of the present invention, a method for controlling a fuel cell in the fuel cell power generator system which includes a fuel cell and a converter which converts the Dc output power from the fuel cell into the corresponding Ac output power, the method comprises the steps of:

at the start-up of the fuel cell, reducing the output voltage across the fuel cell to a certain value by using a resistor that is selectively connected in parallel with the fuel cell;

enabling the converter to be operated when the voltage across the fuel cell has been reduced to the certain value; and keeping the resistor connected in parallel with the fuel cell while the output voltage of the fuel cell is rising, and disconnecting the resistor from the fuel cell when either of the output current from the fuel cell and the output voltage across the fuel cell has reached a certain value.

Here, the step of reducing the output voltage across the fuel cell by using the resistor that is selectively connected in parallel with the fuel cell may include using a switch that is normally closed for connecting the resistor and fuel cell.

The step of keeping the resistor connected in parallel with the fuel cell may include using a discharging resistance control circuit.

The discharging resistance control circuit includes a power element, a power element enable circuit, a stabilized power supply, a voltage setter and a comparator.

In the second aspect of the present invention, an apparatus for controlling a fuel cell in the fuel cell power generator system which includes a fuel cell and a converter that converts the Dc output power of the fuel cell into the corresponding AC output power, the apparatus comprises:

a series circuit consisting of switching means and a resistor connected in series, the switching means being selectively connected in parallel with the fuel cell;

first control means operated when the fuel cell is started up, for controlling the switching means so that it can be connected in parallel with the fuel cell, and for first reducing the voltage across the fuel cell and then rendering the converter operational; and second control means operated while the output power of the fuel cell is rising, for disconnecting the resistor from the fuel cell when either of the output current from the fuel cell and the voltage across the fuel cell has reached a certain value.

The switching means may be normally closed for connecting the fuel cell and the resistance in parallel.

The apparatus may, further include a discharging resistance control circuit that selectively connects the fuel cell and the resistor in parallel.

The discharging resistance control circuit may include a power element, a power element enable circuit, a stabilized power supply, a voltage setter and a comparator.

The first and second control means may be implemented by a microprocessor-based controller.

The above and other objects, and effects, features and advantages of the present invention will become more apparent from the following description of embodiments thereof taken in conjunction with the accompanying drawings.

BRIEF DESCRIPTION OF THE DRAWINGS

Those and other objects, merits and advantages of the present invention will become apparent from the detailed description of several preferred embodiments that follows with reference to the accompanying drawings, in which:

FIGS. 14A, 14B, 14C, and 15 illustrate how the FC is reversed in the second preferred embodiment.

DETAILED DESCRIPTION OF PREFERRED EMBODIMENTS

Referring to the figures, several preferred embodiments of the present invention will be described in further detail.

EMBODIMENT 1

Figure 1:
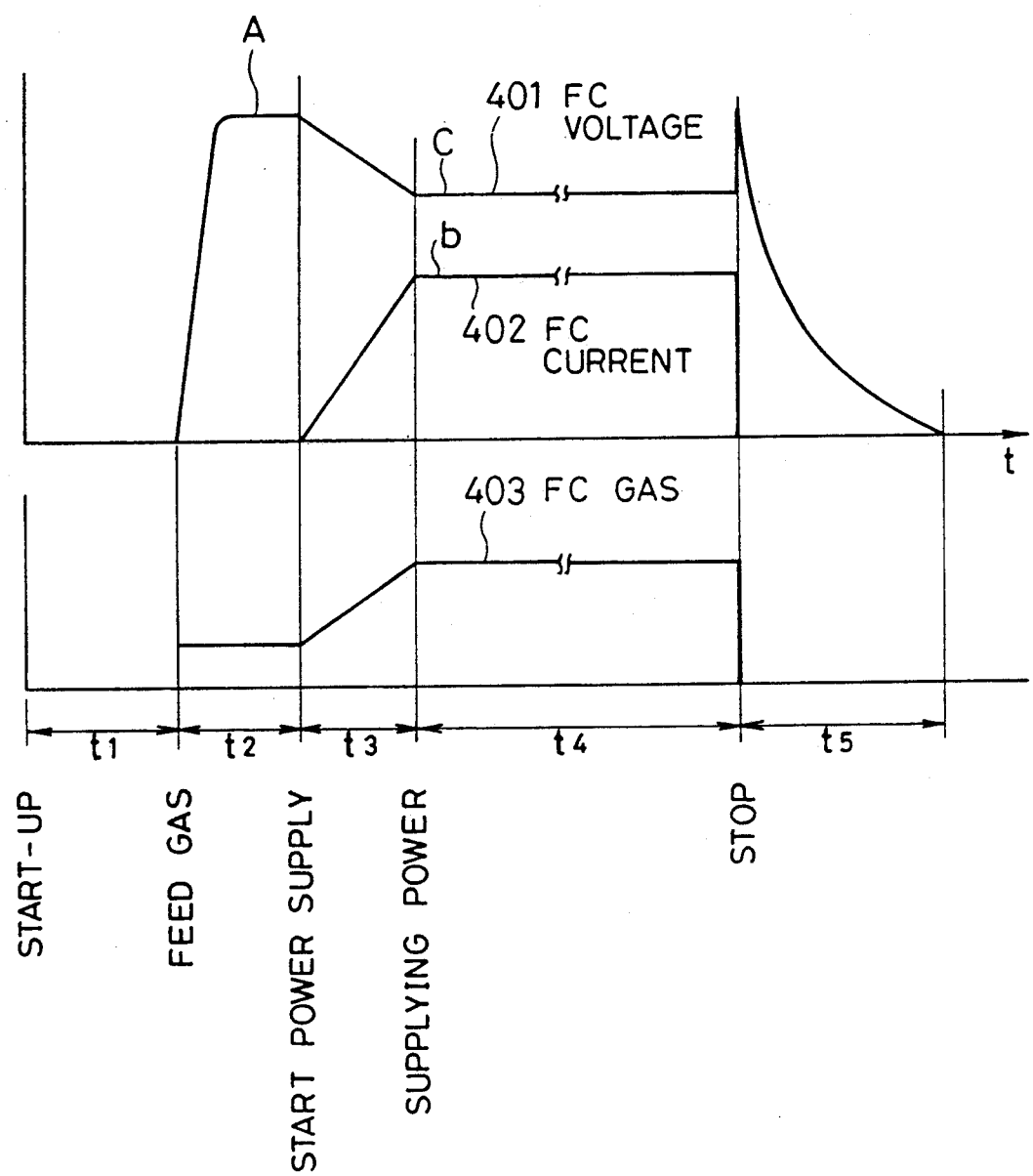
FIG. 1 is a timing chart diagram provided for explaining the operation of the prior art.
Figure 2:
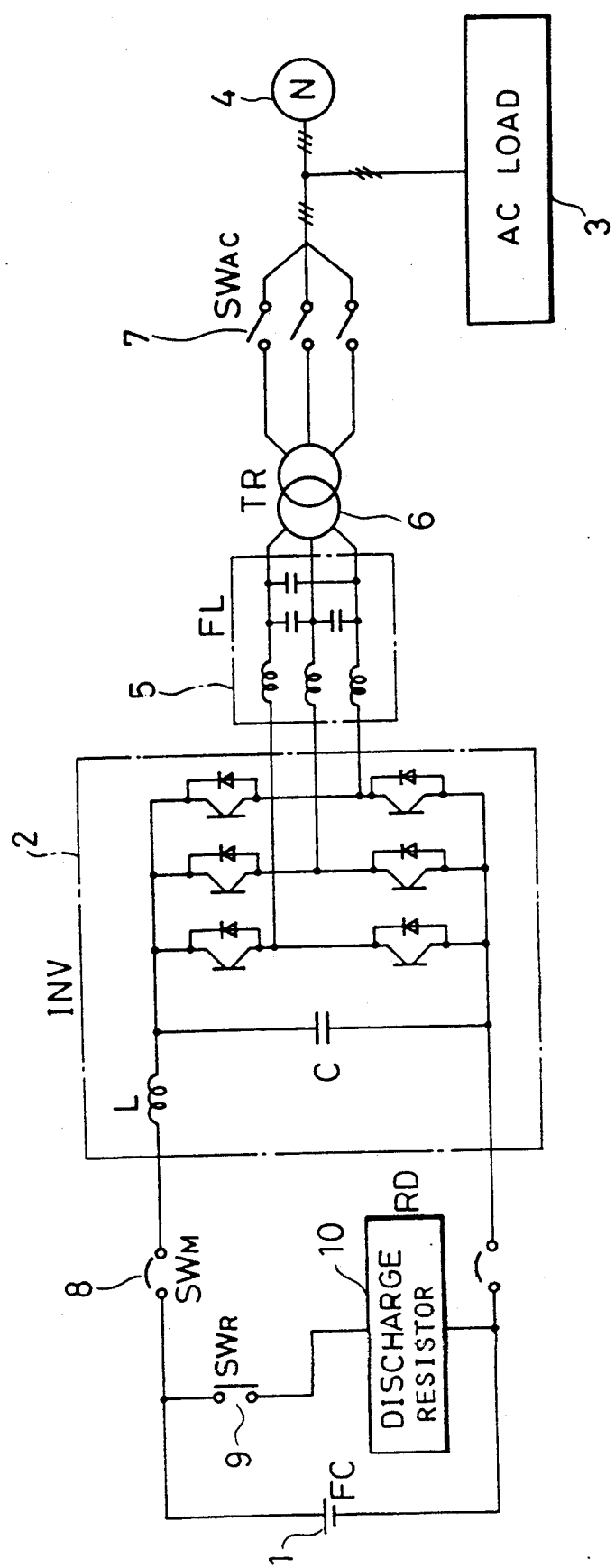
FIGS. 2 and 3A and 3B are circuit diagrams showing prior art examples.
Figure 3A:
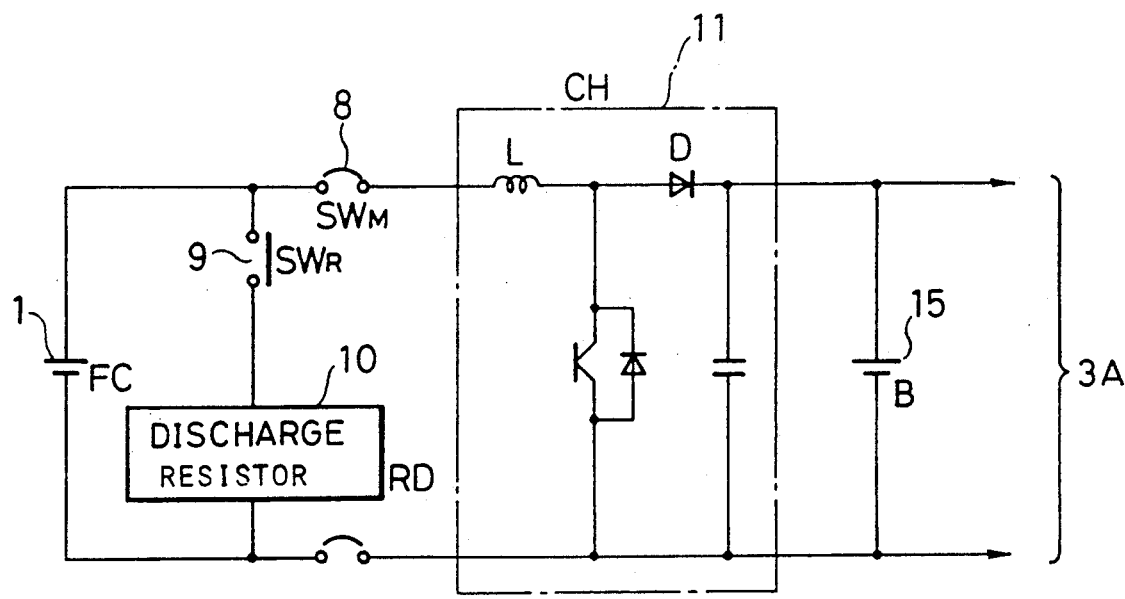
Figure 3B:
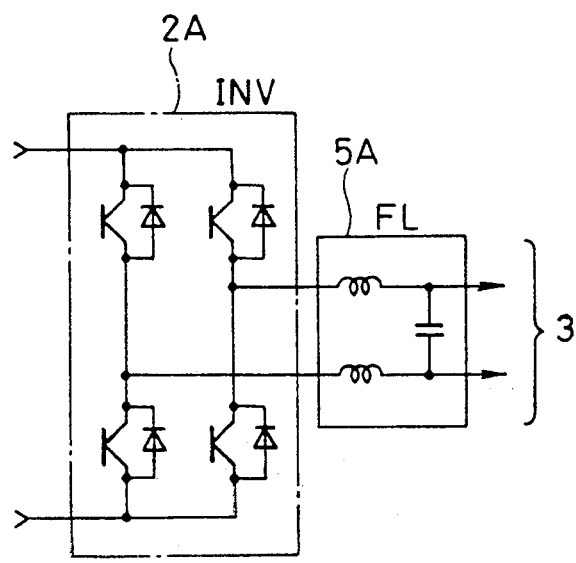
Figure 6:
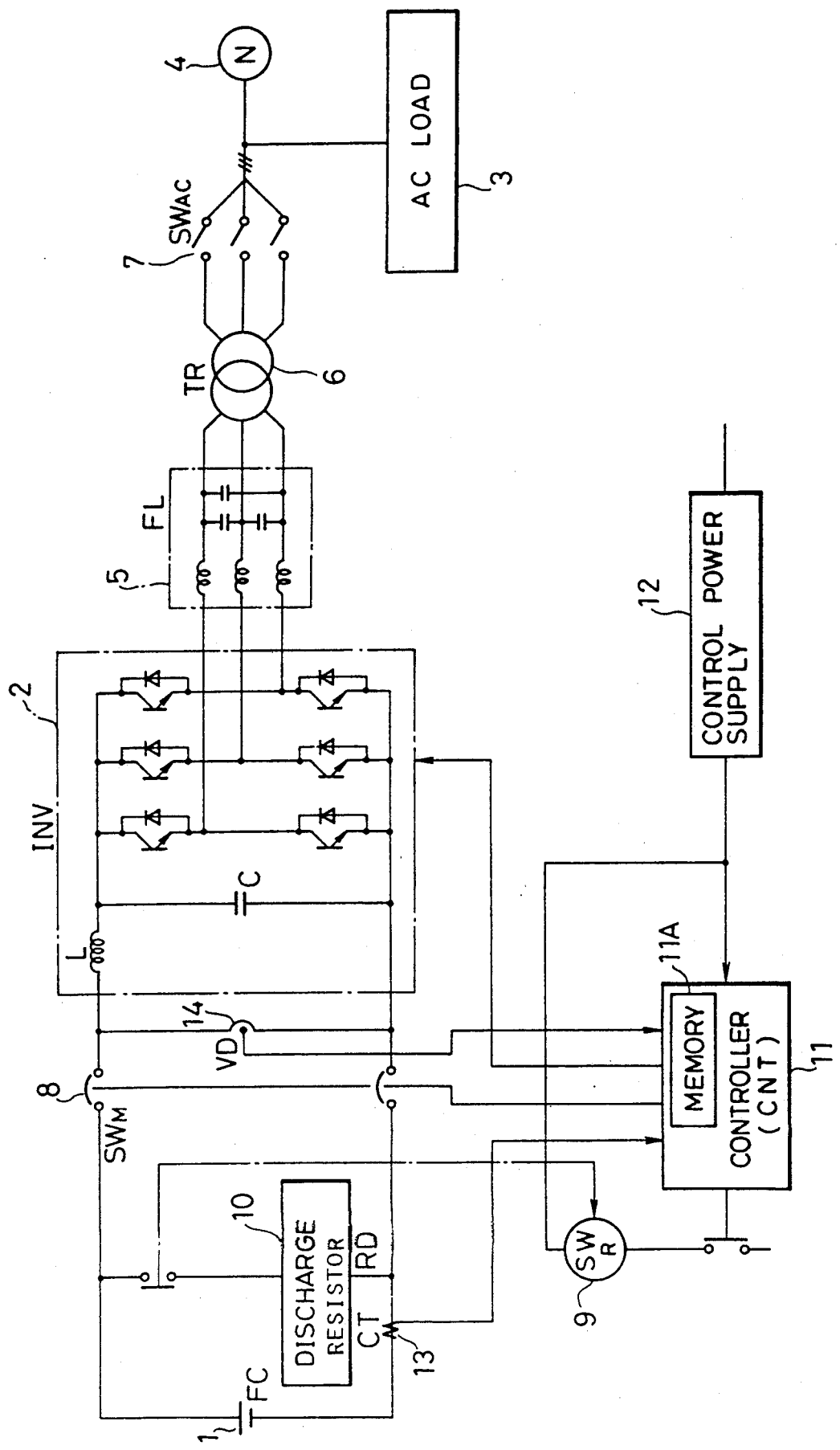
FIG. 6 is a circuit diagram showing a first preferred embodiment of the present invention.

Referring first to FIG. 6, there is a circuit arrangement according to the first preferred embodiment of the present invention. Those parts or elements which are similar to those shown in FIG. 2 are given the same reference numerals in FIG. 6. There is a controller 11 in the form of a microprocessor that provides the control functions for the fuel cell power generator system. The controller 11 contains a memory 11A which stores a sequence of control programs to be executed according to the steps in the flowchart shown in FIG. 8.

The controller 11 is connected to a control power supply 12 which supplies power to the controller 11. A switch ($SW_R$) 9 is also controlled by the power from the control power supply 12 so that it can open and reclose the circuit.

An electric current detector 13 has the form of a current transformer (CT), which detects any current flow from the FC1, and provides a detect signal which is delivered to the controller 11. A voltage detector (VD) 14 detects a voltage appearing across FC1, and provides a detect signal to be delivered to the controller 11.

Figure 4:
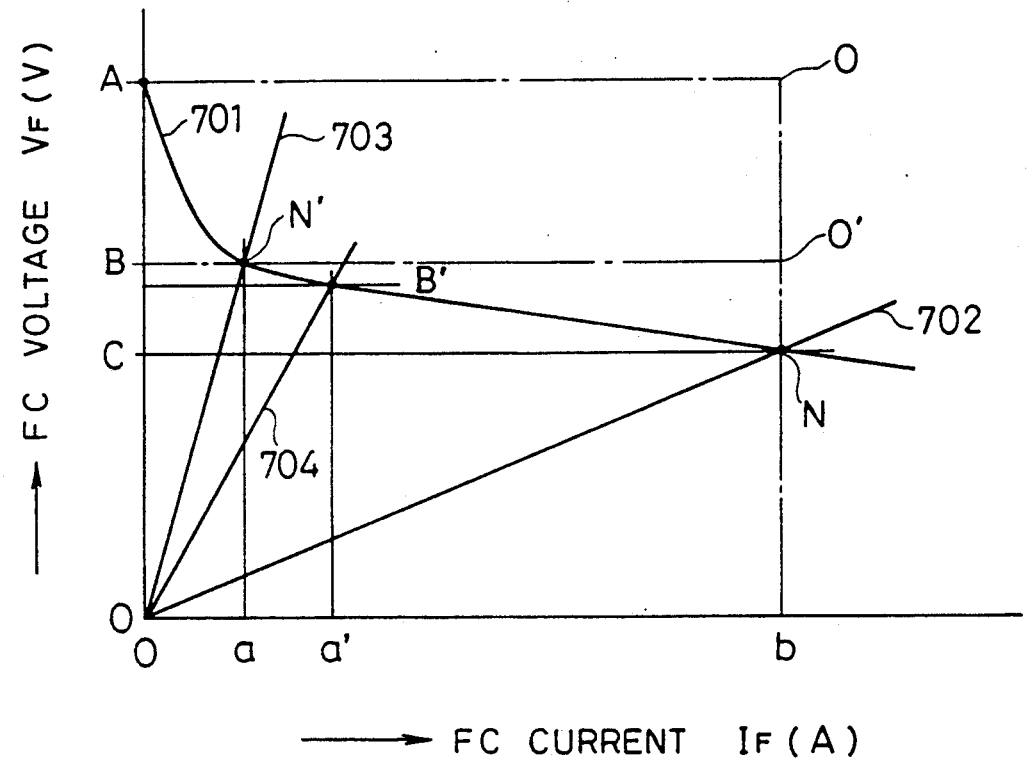
FIG. 4 is a characteristics curve diagram for the circuit shown in FIG. 2.
Figure 5:
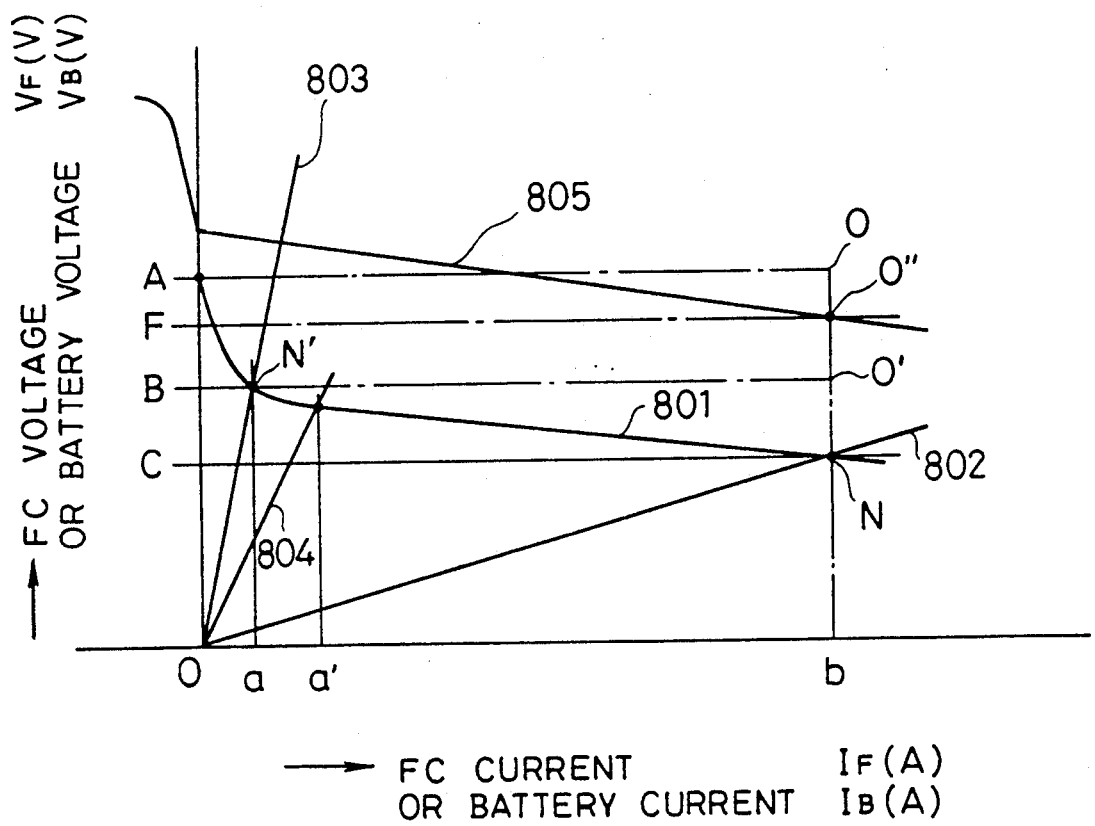
FIG. 5 is a characteristic curve diagram for the circuits shown in FIGS. 3A and 3B.
Figure 7:
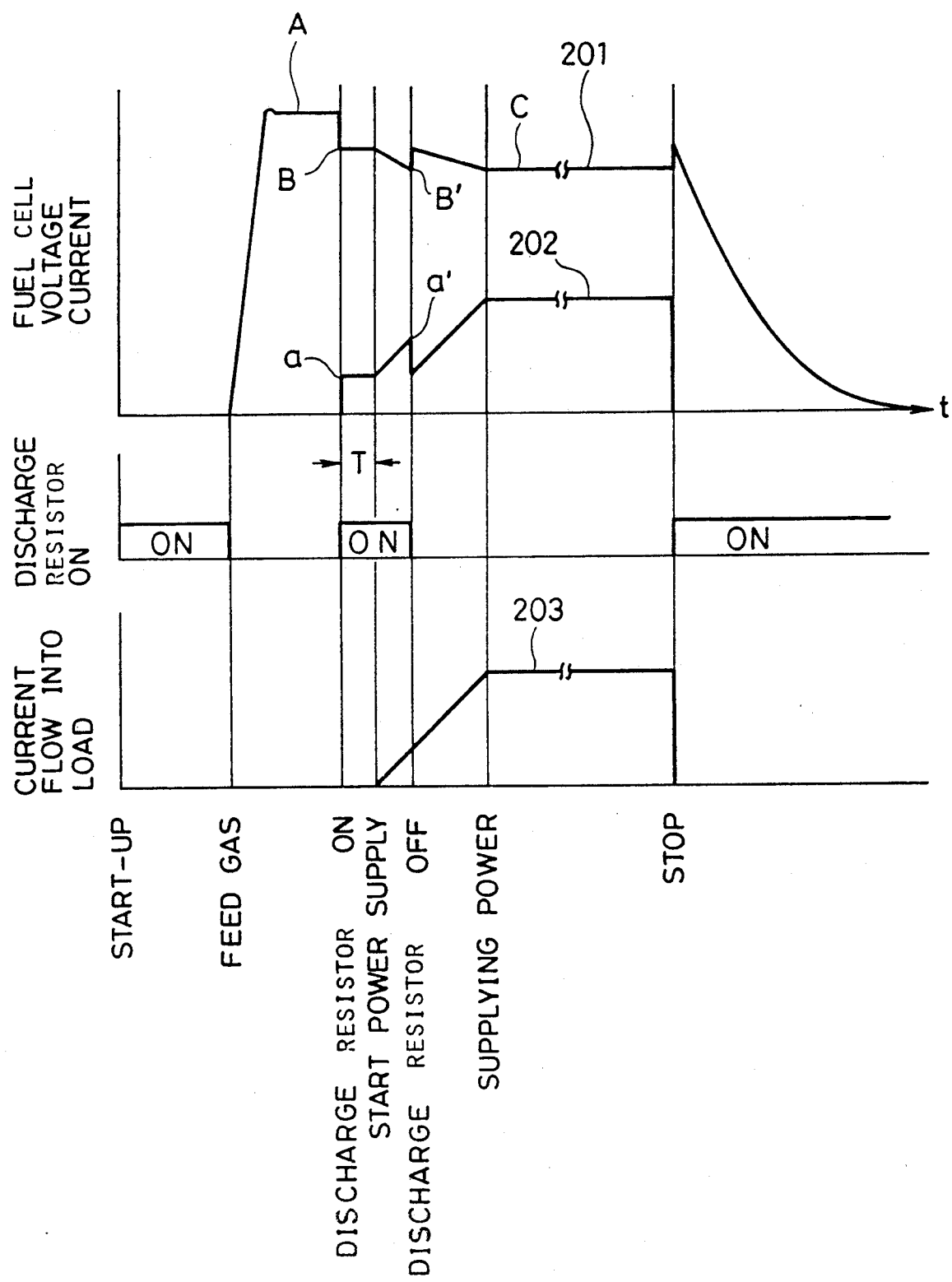
FIG. 7 is a timing chart diagram provided for explaining the operation of the first preferred embodiment.
Figure 8:
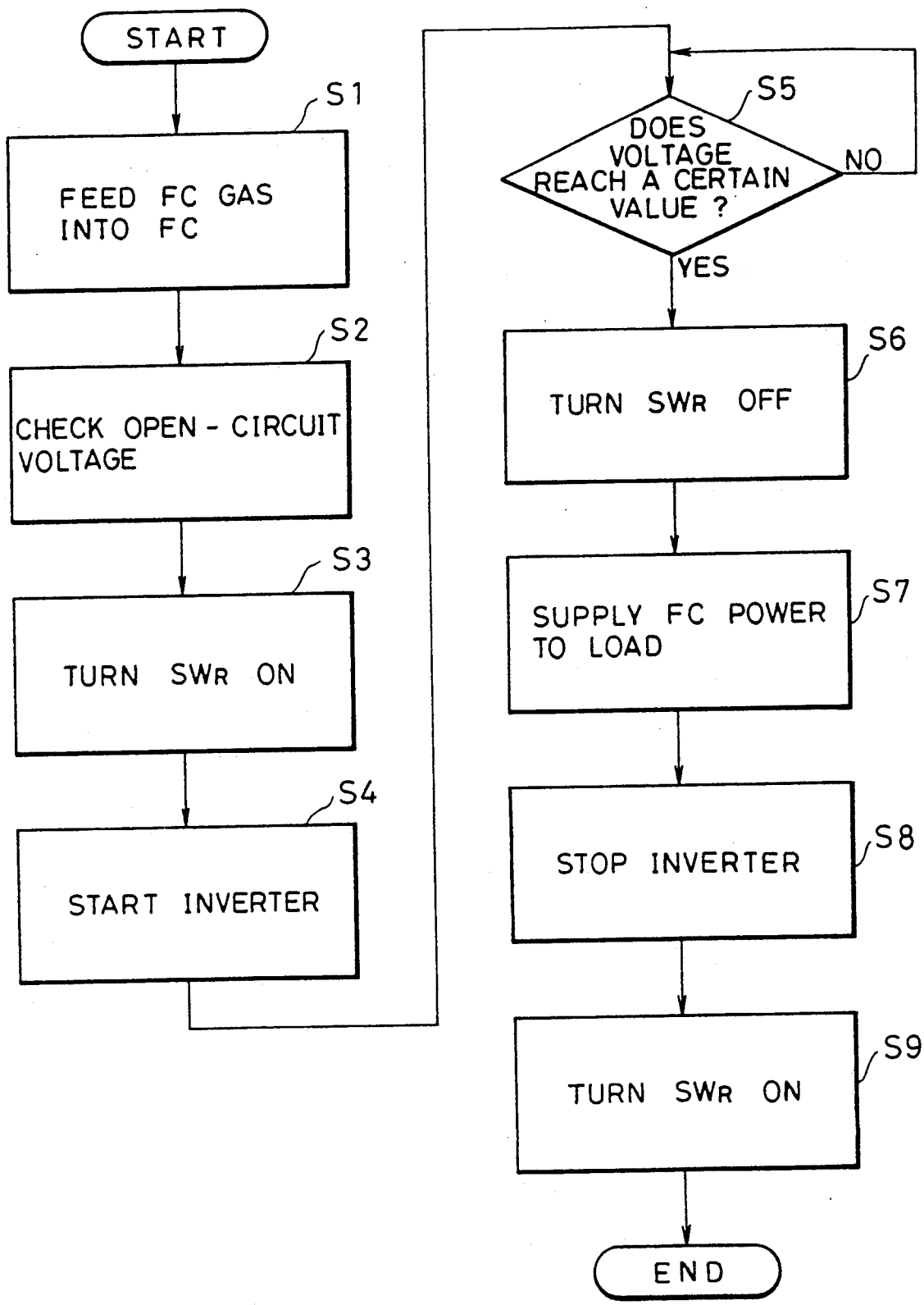
FIG. 8 is a flowchart diagram showing an example of the control procedure in the first preferred embodiment.

FIG. 7 is a timing chart diagram in the embodiment of the present invention, and FIG. 8 shows a flowchart which includes the steps represented by boxes and corresponding to the times in the timing chart. Those segments in the timing chart which are identified by letters A, B', C, a and a' corresponds to those which carry the same letters, respectively, in FIGS. 4 and 5.

As an FC gas is fed into FC1 (step S1), FC voltage as shown by the curve 201 in FIG. 7 is gradually rising until it reaches the voltage value A, when the voltage detector 14 checks for the FC voltage to see whether the open-circuit voltage has increased above the specific value or not (step S2).

In the following step S3, $SW_R$( is closed ("ON"), concluding a subcircuit consisting of the FC1, the $SW_R9$, and the discharging resistor (RD) 10. This closed circuit allows an FC current value of a to flow so shown by curve 202 in FIG. 7, followed by an FC voltage value of B to appear across the discharging resistor (RD) 10.

In T seconds (in which T is practically equal to zero or one second) after the discharging resistor 10 is turned on, the invertor 2 is started up (step S4). Then, the output of the FC1 is gradually increasing until the FC voltage reaches B' when the $SW_R9$ is turned off (steps S5 and S6). At this moment, FC current has a value of a', and the resistance line behaves as shown by lines 704 and 804 in FIGS. 4 and 5.

As the $SW_R9$ is turned off, the discharging resistor 10 which provides a load for the FC1 is open-circuited, causing the FC voltage value to fall back to B and the FC current value back to a. Thus, the current flow through the invertor 2 into the load 3 is increased, as shown by line 203 in FIG. 7. This allows the appropriate amount of power to be supplied to the load 3 (step S7).

When the system is to be stopped, the invertor 2 is also stopped (step S8), turning on the $SW_R9$ which concludes the FC discharging circuit. Thus, any voltage that may be developed within the FC1 due to any remaining gas can be removed quickly (step S9). In case that the control power supply 12 should fail, all operations that are controlled by the power supply will render inoperational. In that even, however, the $SW_R9$ is turned on so as to ensure that all the operations can occur in the sequence described above. Thus, any remaining gas that may produce the extra voltage can be removed in the same manner, and the FC1 can be protected from degradation.

The above description may apply to the situation where at the start-up, the $SW_R9$ may be turned off by detecting the FC voltage. The control as described above may also be accomplished by detecting the specific FC current value. An additional alternative may consist of detecting both voltage and current values, and turning the $SW_R9$ off when both of the values have reached respective particular values. As another alternative, the length of the time taken until either of the FC current and the FC voltage has reached a particular value may previously be measured, and the $SW_R9$ may be controlled by a timer or the like that responds when the above length of time has elapsed.

EMBODIMENT 2

In the second embodiment, at the time of starting up the fuel cell, a resistor is first connected to FC to cause the FC voltage to drop across the resistance, and then the converter is activated. When the power supply is to be stopped, a resistance is first connected so that FC cannot provide a high voltage, and if the FC voltage becomes low, the resistor may be turned on/off so that the polarity of the potential cannot be reversed. In this way, any voltage produced by any residual gas may be removed, and the FC can be protected against any degradation.

Figure 9:
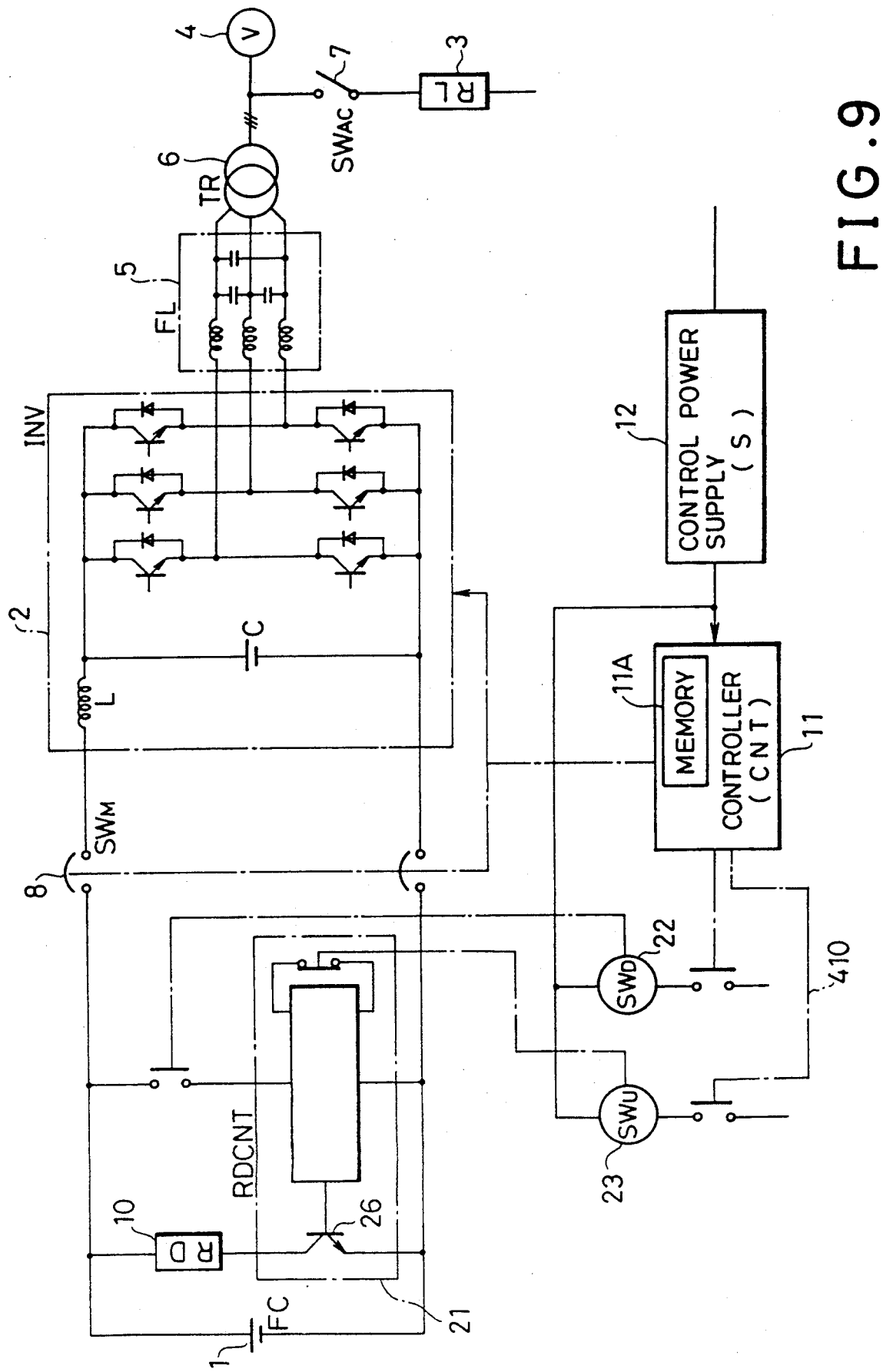
FIG. 9 is a circuit diagram showing a second preferred embodiment of the present invention.

FIG. 9 illustrates the circuit arrangement in the second embodiment. Those parts or elements which are similar to those in FIG. 6 have corresponding number in FIG. 9. A discharging resistance control circuit (RDCNT) 21 is provided, in which power is supplied to the control power supply 12 from a system 4, and the controller 11, control switch ($SW_D$) 22, and control switch ($SW_U$) 23 are connected to the control power supply 12. The discharging resistor (RD) 10 is turned on/off by a power element (which will be described later with respect to FIG. 10) which is provided within the discharging resistance control circuit 21.

Figure 10:
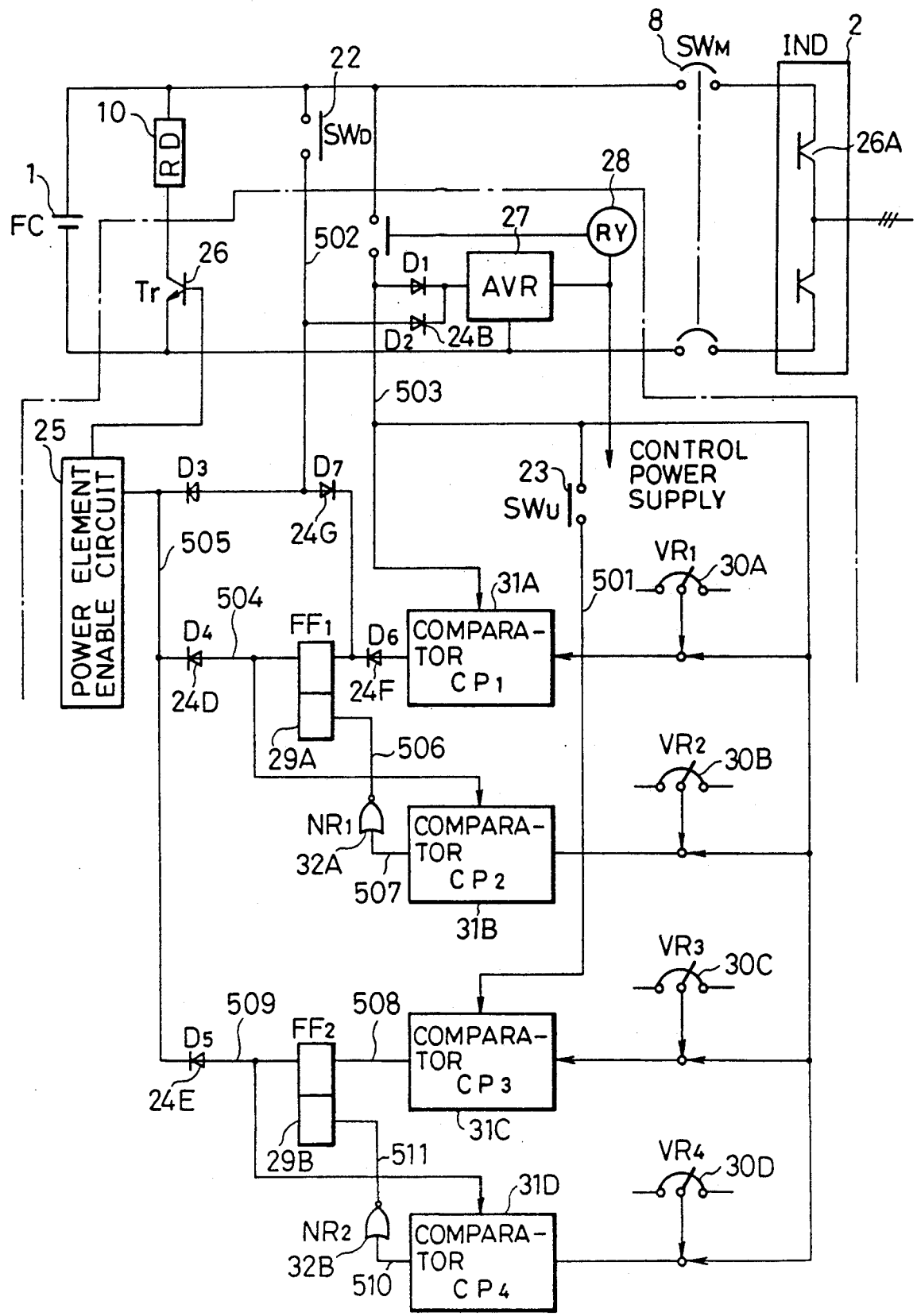
FIG. 10 is a discharging resistance control circuit diagram in the second preferred embodiment.

FIG. 10 shows an example of the discharging resistance control circuit 21. In FIG. 10, the control switch ($SW_U$) 23 remains off until FC1 begins to produce a voltage. The control switch ($SW_D$) 22 turns on when FC1 has produced a voltage and is ready to supply its power to AC load 3.

Figure 11:
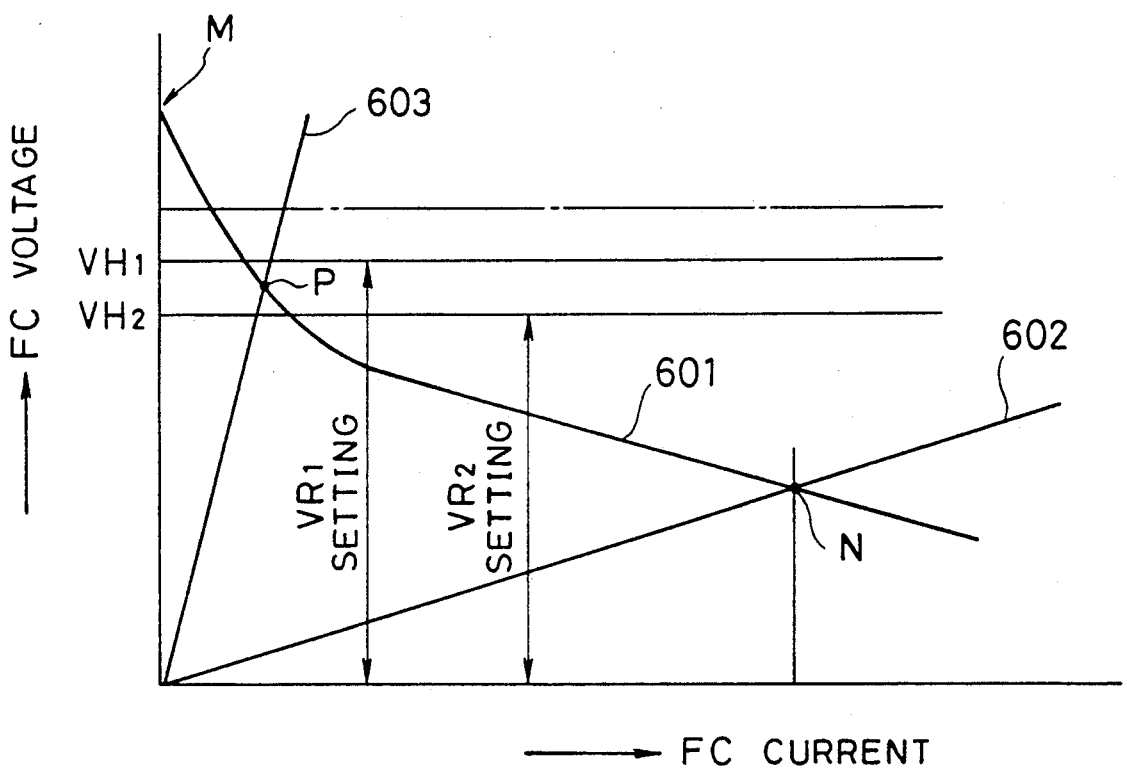
FIGS. 11 and 12 are respective characteristic curve diagrams for a fuel cell in the second preferred embodiment.

FIG. 11 is the I-V characteristic curve diagram for the FC1, from which it may be seen how the element voltage in the invertor 2 forming the converter, the FC voltage (FC operating point) at the time when the discharging resistance 10 is connected, and the voltage detect setting level ($VH_1$ and $VH_2$) (which will be described later) are related to each other.

Figure 12:
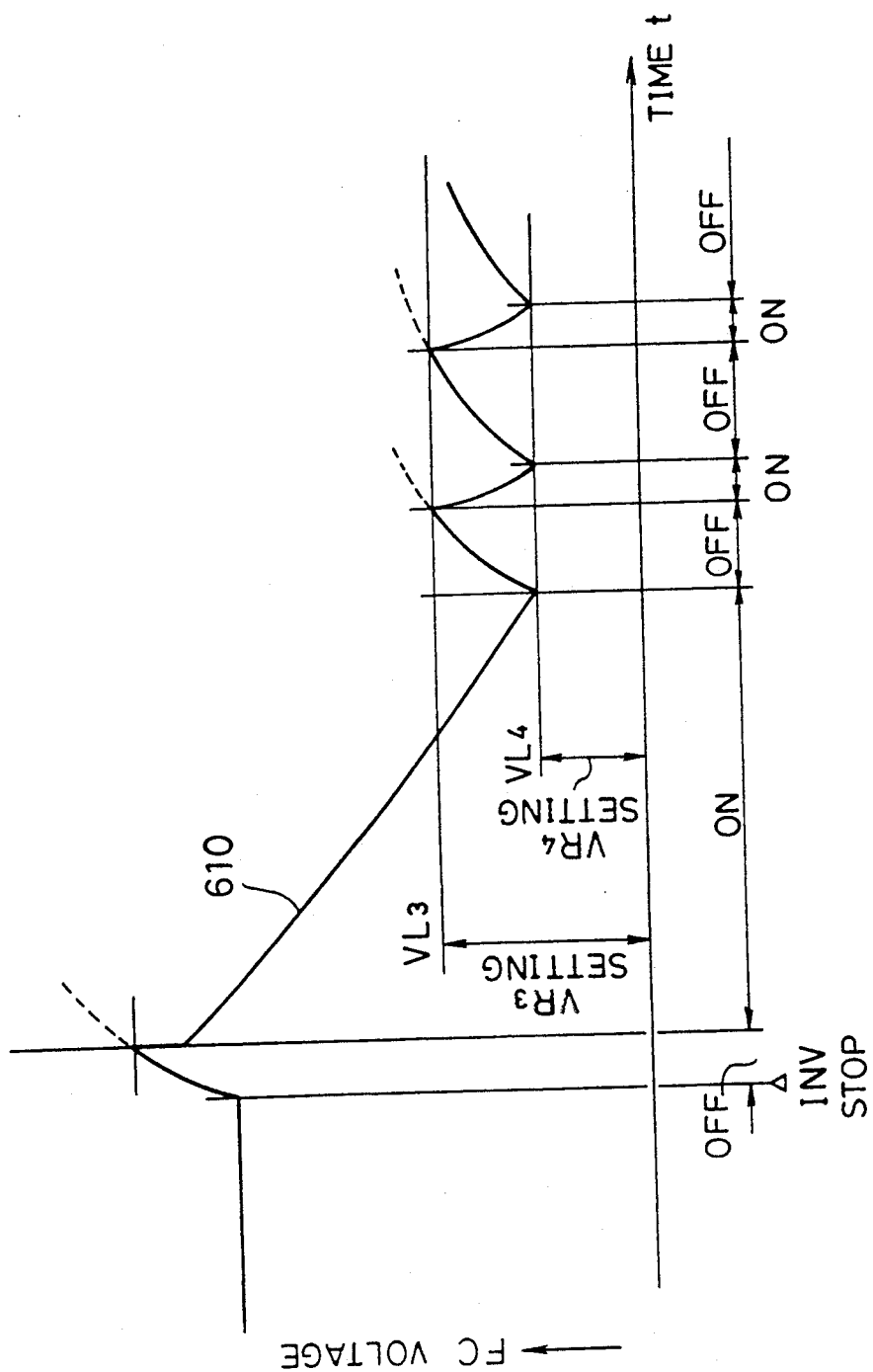

FIG. 12 illustrates the relationships between the discharged voltage at the stop time and the voltage detect setting level ($VL_3$ and $VL_4$).

REferring back to FIG. 11, curve 601 represents the I-V characteristic curve which explains the relationships between FC current $I_F$ and FC voltage $V_F$. Line 602 represents 100% load resistance line, which may be obtained by connecting the origin and the rated point N at the time when FC rated current value is taken along the curve 601. Line 603 represents the discharging resistance line, which may be obtained by connecting the later described point P and the origin. M represents the maximum voltage value that the FC1 can take.

Referring again to FIG. 12, curve 610 represents the relationships between the ON/OFF state of the invertor 2 and the corresponding FC voltage.

With the respective relationships shown in FIGS. 11 and 12 in mind, the operation of the fuel cell power generator system shown in FIG. 10 is now described more specifically. When the power generator system is started up and before FC gas is fed into the FC1, the control switch ($SW_U$) 23 is turned on, opening its contact b and placing signal 501 in "OFF" state. In its "OFF" state, the signal 501 is waiting.

When the FC gas is fed into the FC1 and FC voltage is produced, the control switch ($SW_D$) 22 is turned on, closing its contact a. This allows the FC produced voltage or signal 502 to flow through FC1 and control switch ($SW_D$) 22. This signal 502 turns on the power element enable circuit (BDU) 25 through diode ($D_3$), enabling the power element (Tr) 26 to turn on. This connects the discharging resistor (RD) 10 to the FC1. Connecting the discharging resistor causes the FC voltage to fall down to the point P as shown in FIG. 11.

When the signal 502 flows through diode ($D_2$) 24B, the diode 24B allows the output power from the FC1 to be supplied to a stabilized power supply (AVR) 27, turning relay (RY) 28 on. THen, signal 503 turns on, permitting the control power supply to provide power to each of the control circuits. This effect may be called the "power supply's self-latch."

Signal 502 is connected to the input of flipflop ($FF_1$) 29A through diode ($D_7$) 24G. When the flipflop ($FF_1$) 29A is set, output signal 502 appears at its output. This output signal 504 flows through diode ($D_4$) 24D, and signal 505 enables the BDU25 to turn on, retaining the power element 26 and the discharging resistor (RD) 10 in their respective "ON" states.

Figure 13:
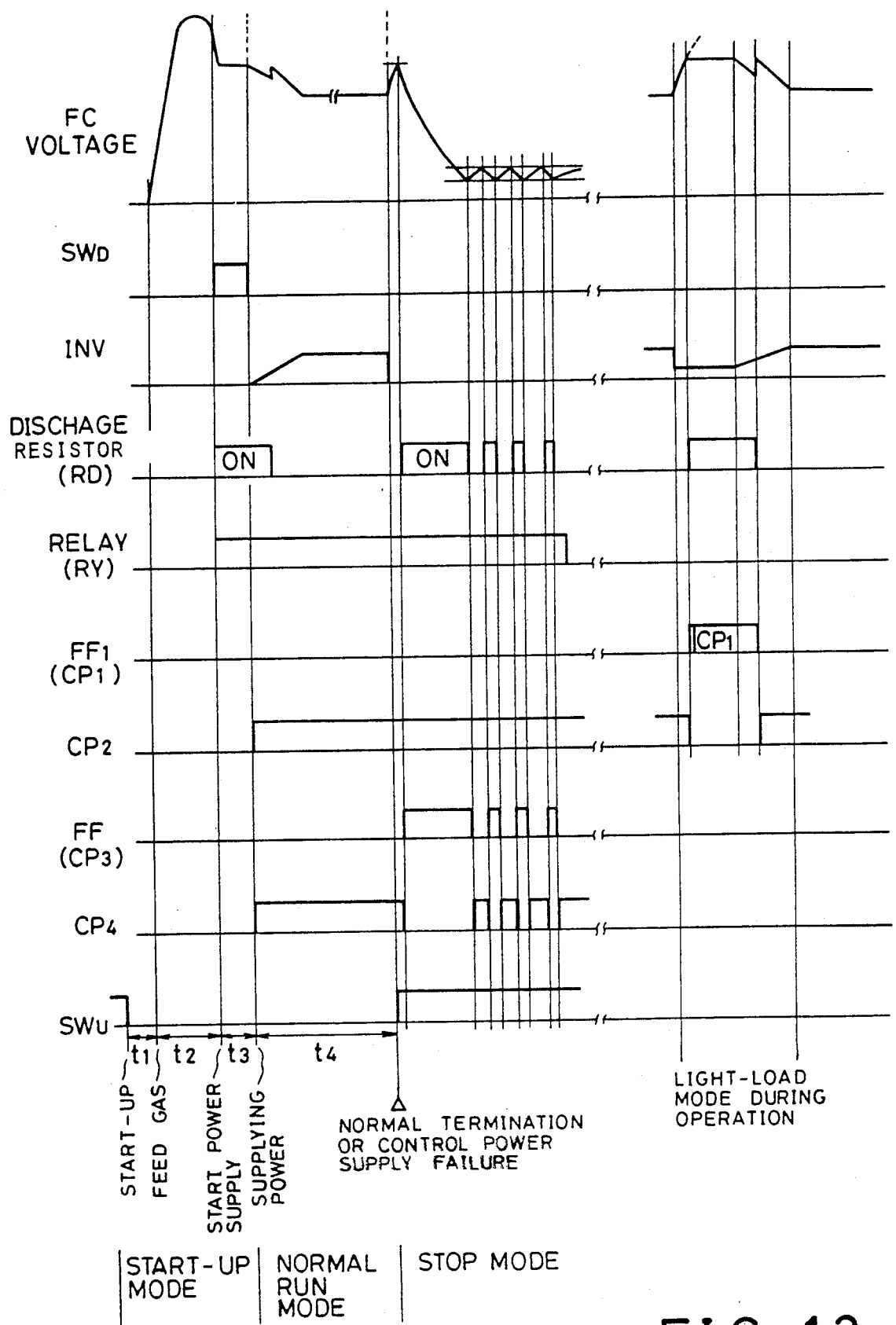
FIG. 13 is a timing chart diagram in the second preferred embodiment.

At the time of the power supplying in FIG. 13, the control switch ($SW_D$) 22 is turned off, and the invertor 2 is started. Then, the output power of the FC1 is gradually increasing, and the FC voltage is falling accordingly as shown in FIG. 13.

At this moment, the value (as represented by signal 502) as shown in FIG. 10 is decreasing until it falls below the voltage value $VH_2$ which has been set by the voltage setter ($VR_2$) 30B, when comparator ($CP_2$) 31B turns off, enabling NOR-gate ($NR_1$) 32A to provide a reversed polarity signal 506. This reversed polarity signal 506 resets flipflop ($FF_1$) 29A. Resetting the flipflop turns the signal 504 off, turning the signal 505 off, followed by turning the BDU25 off, followed by turning the power element (Tr) 26 off. Thus, the discharging resistor (RD) 10 is reopened. Turning the discharging resistor (RD) 10 off causes the output voltage of the FC1 to rise slightly.

Of course, if the value (as represented by signal 503) is below the voltage setting of the voltage setter ($VR_1$) 30A, the comparator ($CP_1$) 31A will not be set, and therefore the discharging resistor (RD) 10 will not turn on.

If a light-load condition occurs during the sequence as shown in FIG. 13, the value (as represented by signal 503) is increasing, and when this value has risen above the voltage setting $VH_1$ of the voltage setter ($VR_1$) 30A, the comparator ($CP_1$) 31A is set, setting the flipflop ($FF_1$) 29A through diode ($D_6$) 24F, followed by turning the signal 504 on, followed by turning the signal 505 on through diode ($D_4$) 24D, followed by turning the BDU25 on, followed by turning the power element (Tr) 26 on, followed by turning the discharging resistor (RD) 10 on. This sequence prevents the FC output voltage from rising, thus protecting the power element 26A in the invertor 2'.

If the comparator ($CP_2$) 31B is set up so that it can operate when the output signal 505 from the flipflop ($FF_1$) 29A is on, the voltage in the invertor 2' will be gradually increasing, beginning with the above light-load condition, and if the value, as represented by signal 503, falls below the voltage setting $VH_2$ of voltage setter ($VR_2$) 30B, the comparator ($CP_2$) 31B turns off, followed by turning signal 507 off, followed by enabling NOR-gate ($NR_1$) 32A to reverse the polarity, followed by turning signal 506 on, followed by resetting flipflop ($FF_1$), followed by turning signal 504 off, followed by turning signal 505 off, followed by turning the BDU25 off, followed by turning the power element (Tr) 26 off. Following this sequence, the discharging resistor (RD) 10 is turned off. In the stop mode, the signal 510 from the controller 11 shown in FIG. 9 turns the $SW_U$23 off, closing its contact b. This turns on signal 501 in FIG. 10, unlocking the comparator ($CP_3$) 31C.

If the comparator ($CP_3$) 31C is set up so that is turns on when the voltage setting $VL_3$ of the voltage setter ($VR_3$) 30C is greater than the value as represented by signal 503, the signal 508 is turned on, followed by setting the flipflop ($FF_2$) 29B, followed by turning the signal 509 on, followed by turning the signal 505 on through the diode ($D_5$) 24E, followed by turning the BDU25 on, followed by turning the power element (Tr) 26 on, followed by turning on the discharging resistor (RD) 10. Through this sequence, any voltage produced by any FC residual gas appears across the discharging resistor (RD) 10, from which the voltage can be removed. When the power generator system is to be stopped, it should be understood that the supplying gas of the FC1 will also be stopped.

When signal 509 unlocks the comparator (CP4) 31D, and its value falls below the voltage setting VL4 of the voltage setter (VR4) 30D, the sequence occurs, starting with turning the comparator (CP4) 31D off, followed by turning signal 510 off, followed by enabling NOR-gate (NR2) 32B to provide a reversed polarity signal, followed by turning signal 511 off, followed by resetting flipflop (FF2) 29B. Following that sequence, signal 509 is turned off, followed by turning signal 505 off through the diode (D5) 24E, followed by turning the BDU25 off, followed by turning the power element (Tr) 26 off, followed by turning the discharging resistor (RD) 10 off. Through this sequence, the discharging resistance (RD) 10 is disconnected from the FC1.

When the discharging resistance (RD) 10 is turned off as shown in FIG. 12, any fuel gas and air that may remain in the FC1's electrodes will induce the electrochemical reaction, which causes the FC voltage to be gradually rising again.

At this moment, if the value (as represented by signal 503) has risen above the voltage setting VL3 of the voltage setter (VR3) 30C, the sequence occurs, starting with turning the comparator (CP3) 31C on, followed by turning signal 508 on, followed by setting flipflop (FF2) 29B, followed by turning signal 509 on, followed by turning signal 505 on through diode (D5) 24E, followed by turning the BDU25 on, followed by turning the power element (Tr) 26 on, followed by turning the discharging resistor (Rd) 10 on. The FC voltage appears across the discharging resistor (RD) 10, from which it is gradually falling unit it can completely be removed.

When the value (as represented by signal 503) has then fallen below the voltage setting VL4 of the voltage setter (VR4) 30D, the sequence is performed, starting with turning the comparator (CP3) 31C off, followed by turning signal 510 off, followed by enabling NOR-gate (NR2) 32B to reverse the polarity of the signal, followed by turning signal 511 on, followed by resetting flipflop (FF2) 29B. Finally, the discharging resistor (RD) 10 is turned off.

The sequences that have been described will be repeated until the voltage produced due to the FC residual gas and appearing across the discharging resistor (RD) 10 can completely be removed rapidly.

Now, how the polarity of the FC voltage is reversed is described by referring to FIGS. 14A, 14B, and 14C, which show the gradient of the FC voltage that is to be discharged from the FC cells during the discharging operations. Specifically, FIG. 14A shows the direction of the flow of FC current $I_F$. FIG. 14B shows the gradient of the FC current in the set of the upper-layer cells 1A when the voltage is to be discharged. FIG. 14C shows the similar gradient for the set of the lower-layer cells 1B.

Generally, FC1 is composed of several tens to several hundreds of individual cells which are grouped into the upper layer set and the lower layer set, each layer set having those individual cells stacked one over another vertically. During the discharging sequence, the voltage that has been developed across the set of the lower-layer cells 1B will disappear earlier than the voltage across the set of the upper-layer cells 1A.

Figure 15:
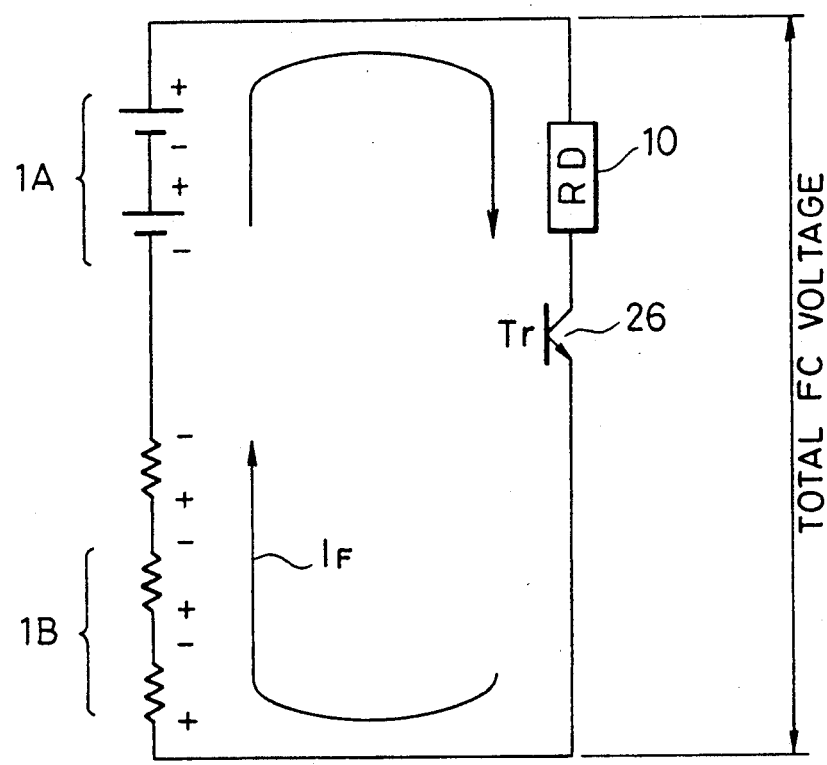

With the discharging resistor (RD) 10 remaining connected during the discharging operation, the voltage across the upper-layer cells 1A causes FC current $I_F$ to flow through the discharging resistor (RD) 10 as shown in FIG. 15. WHen all of the residual gas that exists in the lower-layer cells 1B has been consumed, however, the lower-layer cells 1B will turn into a resistor made of a carbon electrode. Thus, a potential which has a reversed polarity opposed to that of the potential developed during the normal power generation will be developed. This produced potential of the reversed polarity may affect the carbon electrode, so that it becomes oxidized and corroded. This action may shorten the life of the FC1.

To ensure that the total FC voltage or the signal 503 shown in FIG. 10 will never have its polarity reversed as shown in FIG. 15, the appropriate voltage setting may be provided by the voltage setter (VR4) 30D so that the FC1 cannot be affected. In this way, the FC can discharge under the optimal condition.

In case that the control power supply should fail (BLACK-OUT), the power supply 12 shown in FIG. 9 may be turned off, causing signal 503 to turn off, followed by turning the SW$_U$23 off. This sequence caused the contact b of the SW$_U$23 to close, enabling the FC1 to discharge.

According to the embodiment that has just been described, when the system is to be started up, the sequence consists of first connecting the discharging resistance of FC1, and then activating the invertor 2 when the FC voltage has dropped to the certain level across the RF 10. If any light-load condition should occur while the FC power generator system is running, the discharging resistor remains to be connected to ensure that the input voltage to the invertor 2' will never rise above the certain level. When the FC power generator system is terminated normally or if the control power supply should fail, the discharging control circuit that responds to any FC residual voltage may help the system discharge it rapidly. Thus, the FC1 will not be affected by the high voltage discharge that might otherwise occur. At the end of the discharging sequence, the FC reversed potential that might cause a difference in the discharging characteristics between the upper-layer and lower-layer cells can be eliminated. Thus, the FC1 will not be affected.

According to the preferred embodiments described heretofore, the invertor 2' that forms the converter can be reduced, and can also provide its high efficiency of conversion. In addition, the FC1 can be protected against any degradation that might occur due to any FC residual gases.

As it may be readily appreciated from the foregoing description, the sequence according to the present invention consists essentially of checking to see whether there is an open-circuit voltage at the start-up of the FC, lowering the FC voltage by using the discharging resistance, and then allowing the converter to be operated. This sequence advantageously permits the use of the reduced-size converter.

The switch which is actuated for connecting or disconnecting the discharging resistor and FC may have its contact normally closed. As such, when the fuel cell power generator system is terminated normally or if the control power supply source should fail, the FC may continue to discharge any FC residual voltage that may be developed due to any residual FC gases by consuming the residual gases completely. This advantageously protects the FC against any degradation effectively and reliably.

It should be noted, furthermore, that any high voltage that may occur when the FC is placed under no load condition may appear across the resistive load, from which the high voltage can be made to fall. The power element that forms part of the converter may provide a lower withstanding voltage property. This also advantageously permits the use of the reduced-size converter that yet provides its high efficiency of conversion.

When the power generator system is to be stopped, any residual FC voltage caused by any FC residual gases may be used so that the resistive load coupled with the discharging resistance can discharge the FC rapidly. Thus, the FC can be effectively protected against the degradation.

Although the present invention has been described by way of the several preferred embodiments thereof, ti should be understood that various changes and modifications may be made without departing from the spirit and scope of the invention.

The invention has been described in detail with respect to preferred embodiments, and it will now be apparent from the foregoing to those skilled in the art that changes and modifications may be made without departing from the invention in its broader aspects, and it is the invention, therefor, in the appended claims to cover all such changes and modifications as fall within the true spirit of the invention.

What is claimed is:

1. A method for controlling a fuel cell in the fuel cell power generator system which includes a fuel cell and a converter which converts the DC output power from the fuel cell into the corresponding AC output power, the method comprising the steps of:
   at the start-up of said fuel cell, reducing the output voltage across said fuel cell to a certain value by resistor that is selectively connected in parallel with said fuel cell;
   enabling said converter to be operated when the voltage across said fuel cell has been reduced to the certain value; and
   keeping the resistor connected in parallel with said fuel cell while the output voltage of said fuel cell is rising, and disconnecting said resistor from said fuel cell when either of the output current from said fuel cell and the output voltage across said fuel cell has reached a certain value.

2. A method as claimed in claim 1, wherein the step of reducing the output voltage across said fuel cell by using said resistor that is selectively connected in parallel with said fuel cell includes using a switch that is normally closed for connecting said resistor and fuel cell.

3. A method as claimed in claim 1, wherein the step of keeping said resistor connected in parallel with said fuel cell includes using a discharging resistance control circuit.

4. A method as claimed in claim 3, wherein said discharging resistance control circuit includes a power element, a power element enable circuit, a stabilized power supply, a voltage setter and a comparator.

5. An apparatus for controlling a fuel cell in said fuel cell power generator system which includes a fuel cell and a converter that converts the DC output power of said fuel cell into the corresponding AC output power, the apparatus comprising:
   a series circuit consisting of switching means and a resistor connected in series, the switching means being selectively connected in parallel with said fuel cell;
   first control means operated when said fuel cell is started up, for controlling said switching means so that it can be connected in parallel with said fuel cell, and for first reducing the voltage across said fuel cell and then rendering said converter operational; and
   second control means operated while the output power of said fuel cell is rising, for disconnecting said resistor from said fuel cell when either of the output current from said fuel cell and the voltage across said fuel cell has reached a certain value.

6. An apparatus as claimed in claim 5, wherein said switching means is normally closed for connecting said fuel cell and said resistor in parallel.

7. An apparatus as claimed in claim 5, further including a discharging resistance control circuit that selectively connects said fuel cell and said resistor in parallel.

8. An apparatus as claimed in claim 7, wherein said discharging resistance control circuit includes a power element, a power element enable circuit, a stabilized power supply, a voltage setter and a comparator.

9. An apparatus as claimed in claim 5, wherein said first and second control means are implemented by a microprocessor-based controller.

* * * * *

UNITED STATES PATENT AND TRADEMARK OFFICE
CERTIFICATE OF CORRECTION

PATENT NO. : 5,023,150

DATED : June 11th, 1991

INVENTOR(S) : Yasuhiro TAKABAYASHI

It is certified that error appears in the above-identified patent and that said Letters Patent is hereby corrected as shown below:

ON TITLE PAGE: Item
[30] Foreign Application Priority Data should read

```
Aug. 19, 1988 [JP]   Japan ......... 63-204765
Jun  22, 1989 [JP]   Japan .........  1-158300
```

Signed and Sealed this

Thirteenth Day of October, 1992

*Attest:*

DOUGLAS B. COMER

*Attesting Officer*     *Acting Commissioner of Patents and Trademarks*